Sept. 20, 1971  L. N. HAVENER  3,606,223

OUTLET BOX MOUNTING CLIP

Filed March 21, 1969  2 Sheets-Sheet 1

INVENTOR.
LESLIE N. HAVENER

BY

Meyer, Tilberry & Body
ATTORNEYS

Sept. 20, 1971        L. N. HAVENER        3,606,223

OUTLET BOX MOUNTING CLIP

Filed March 21, 1969        2 Sheets-Sheet 2

INVENTOR.
LESLIE N. HAVENER
BY
*Meyer, Tilberry & Body*
ATTORNEYS

United States Patent Office 3,606,223
Patented Sept. 20, 1971

3,606,223
OUTLET BOX MOUNTING CLIP
Leslie N. Havener, Euclid, Ohio, assignor to Spring
Steel Fasteners, Inc., Cleveland, Ohio
Filed Mar. 21, 1969, Ser. No. 809,061
Int. Cl. H02g 3/12
U.S. Cl. 248—205                                    7 Claims

ABSTRACT OF THE DISCLOSURE

An interim mounting clip for use in dry wall partition construction, adapted to temporarily hold an electrical outlet box onto a U-shaped metal channel stud prior to fastening dry wall panels to the stud flanges. The clip comprises a portion adapted to fit over and grip an edge of the outlet box, at least one arm which engages a flange edge of the channel, and a leg in diverging relationship with the arm. The leg is bent in a reverse direction intermediate its ends to define upper and lower portions and a knee at the bend of the leg, the leg lower portion being wedged in the corner between the flange and base of the stud. The clip thereby supports the outlet box in position until the dry wall is installed and forms the final support.

---

The present invention relates to the art of fasteners, and more particularly to a mounting clip for an electrical outlet box.

The invention is particularly applicable to metal stud and dry wall construction, and will be described with particular reference thereto, although it will be appreciated that the invention has broader application.

Partitions or walls for commercial and institutional buildings today are frequently constructed of dry wall panels attached to metal studs. The metal studs are in the form of channel rolls formed from galvanized steel, in various widths and lengths to satisfy job requirements. The channels are of U-shaped cross-section including opposite parallel side flanges connected together by a generally flat base section or web. The longitudinally extending free edges of the flanges are inwardly curled to form beads or lips adding structural strength to the channel flanges, the base section or web of the channel usually being raised along its center so as to define narrow longitudinally extending side troughs adjacent the flanges which add strength to the base section.

When used as studs in a partition, the channels are secured in an upright position on spaced centers, oriented so that the dry wall panels making up the partition can be attached to the opposite channel flanges, secured to the flanges by screws threaded through the panels into the flanges, or by other means.

It is necessary to install electrical cables and outlet boxes before fastening the dry wall panels in place. Since these electrical outlet boxes ultimately are mounted on the dry wall panels, it is necessary to find an interim means for holding the boxes in a desired position until the panels are installed. It is known to provide interim mounting attachments adapted to hold the outlet boxes to the metal studs. However, these known attachments suffer from several disadvantages, one being that time consuming care is required to mount the outlet boxes correctly. Through careless installation, the boxes can be held in a plane askew from that of the dry wall panel which is ultimately installed, making it difficult or impossible to properly fasten them to the panel, and detracting from the quality of the ultimate construction and its appearance.

Another disadvantage is that the interim mounting attachments, because of their design may have metal parts or protrusions which extend into the electrical outlet box, providing a source for possible shorting within the box.

These and other disadvantages are overcome in a simple and economical manner in accordance with the present invention by providing an interim mounting clip comprising a head portion adapted to engage a side wall of an electrical outlet box. A forwardly extending arm means is adapted to engage a flange lip of a metal stud, the clip further comprising a leg means bent intermediate its ends to define an upper portion in diverging relationship with the arm means, a knee and a rearwardly projecting lower portion, the knee and lower portion being engageable with and wedged in the corner between the flange and base of the stud.

Preferably, the clip head portion comprises parallel spaced surfaces adapted to engage an outlet box side wall, the surfaces establishing a first plane, the arm means having tip ends which with said knee establish a second plane substantially perpendicular with the first plane, the leg upper and lower portions defining acute angles with the second plane.

For purposes of this application, it is to be understood that the terms upper, lower, forwardly, rearwardly and downwardly are used to describe a spatial relationship of component parts, and are not used in their abstract sense.

In accordance with a more limited aspect of the present invention, the knee defines a longitudinally extending line of contact in the second plane adapted to engage a metal stud flange, the lower portion comprising a pair of spaced feet adapted to engage the metal stud base at two spaced contact points in a line parallel to the second plane.

In accordance with a further preferred aspect of the invention, the fixture engaging head is U-shaped defining a rearwardly facing slot, including prongs extending upwardly and forwardly into said slot, the roof of the slot defining a generally flattened planar surface.

Accordingly, it is an object of the present invention to provide a fastener of simpler and improved construction, and in particular to provide an electrical outlet box interim mounting clip of spring steel which is able to accurately position the box without undue care on the part of workman installing the box.

It is further an object of the invention to provide an outlet box interim mounting clip which is not likely to cause a short within the box.

These and other objects and advantages will become apparent from the following detailed description, with reference to the accompanying drawings, in which.

Figure 1:
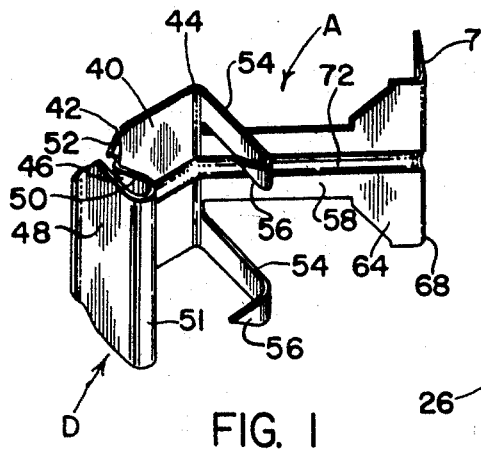
FIG. 1 is a front perspective view of an electrical outlet box mounting clip in accordance with the concepts of the present invention.

Referring now to the drawings wherein the showings are for the purpose of illustrating the preferred embodiment of the invention only and not for the purpose of limiting the same, the figures show a mounting clip A adapted to hold an electrical outlet box B onto a metal stud C, the mounting clip including a head portion D which is adapted to engage a wall of the outlet box B.

Figure 2:
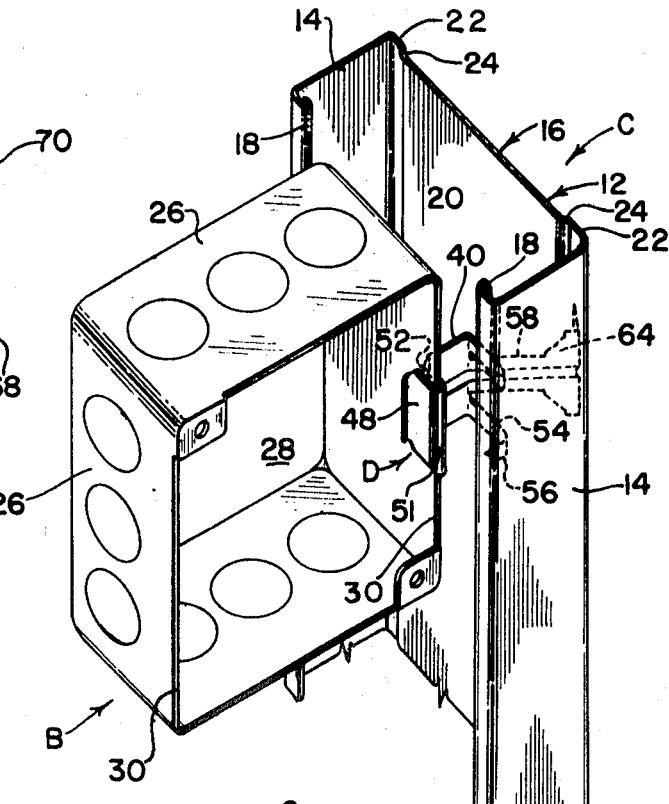
FIG. 2 is an assembly view showing use of the mounting clip of FIG. 1.

Referring to FIG. 2, the metal stud C is of conventional configuration, comprising a U-shaped channel 12 roll formed from galvanized steel having opposite parallel flanges 14 between which is a generally flattened base section or web 16 connecting the flanges together, and generally at right angles to the flanges. The free edges of the flanges are curled inwardly and doubled over to provide lips or beads 18, spaced from the web 16, and extending longitudinally along the extremities of the flanges.

To provide additional strength to the channel, the web or base section 16 of the channel is provided with an axially extending raised and generally flattened center portion 20 defining longitudinally extending, narrow, parallel troughs 22 adjacent the flanges 14, the troughs being defined along the inner sides thereof by parallel ridges 24 spaced inwardly from the flanges.

The electrical outlet boxes B are of conventional configuration, being generally rectangular in shape including four side walls 26, closed at one end by a base 28, and open, prior to assembly, at the other end, so that the edges 30 of the side walls are free and exposed.

Figure 3:
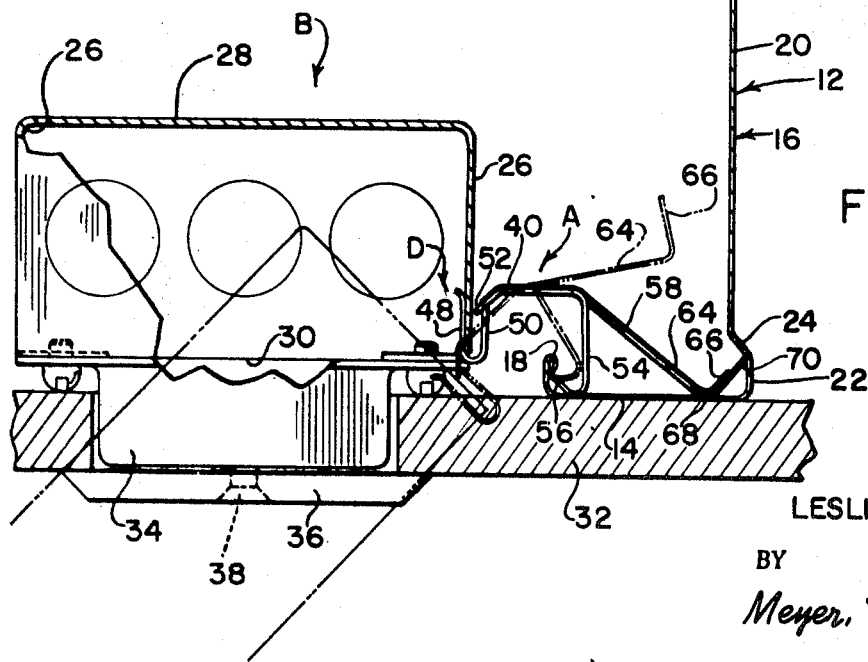
FIG. 3 is a plan view illustrating operation of the mounting clip of FIG. 1 in accordance with the concepts of the present invention.

FIG. 3 shows the relationship of the parts following the partition wall construction. A dry wall panel 32 is fastened to one of the flanges 14 of the channel 12 by means of screws or fasteners or other means, the dry walls thereby lying in planes at right angles to the plane of the web 16 of the channel. It is conventional practice to recess the outlet box B slightly behind or inside of the dry wall panel 32, secured to the panel in a known manner, with the cover plate 34 of the outlet box lying in part in the plane of the dry wall, but parallel with the dry wall. A face plate 36 is then attached to the cover plate by a pair of spaced screws 38, the face plate bearing against the outer surface of the dry wall.

In order to obtain a workmanship-like job, it clearly is desirable to have the outlet box B oriented as shown with the walls 26 thereof at right angles to the dry wall panels 32. Since the flanges 14 of the studs C are parallel with the dry wall panels, the flanges, during the interim construction period when the panels are not in place, offer a reference plane.

In accordance with the present invention, there is provided a mounting clip or fastener, cut and shaped from a flat strip of spring steel, comprising a generally flattened, rectangular, trunk portion 40 (FIG. 1) having upper and lower parallel ends 42 and 44. Attached to the trunk portion upper end is the fixture engaging head portion D.

To secure the mounting clip to an electrical outlet box, or vice-versa, the clip head portion D is U-shaped comprising a rearwardly facing slot 46 defined by upper and lower substantially parallel, planar surfaces 48 and 50, the lower planar surface being joined to the upper end 42 of the trunk portion 40, at about right angles to the trunk portion. A side wall 26 of the outlet box is hammered or pressed, free edge (30) forward, into the slot 46, and is retained therein, with the edge 30 against and parallel with the nose 51 of the head portion, by a pair of spaced pointed contacts or prongs 52 which dig into the softer metal of the outlet box pressing the wall of the outlet box against the upper planar surface 48.

Figure 5:
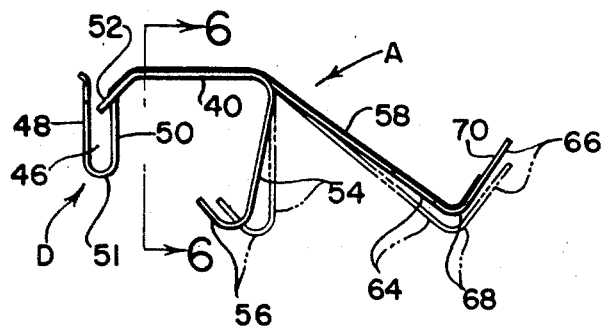

Extending from the trunk portion lower end 44 are spaced apart forwardly extending arms 54 which arms terminate in upwardly extending pointed ends or tips 56. With reference to FIG. 5, these arms lie in the same plane, and normally at slightly less than 90° with respect to the trunk portion 40. Although the tips 56 are shown as pointed, they can be flat on their ends, or of other configuration.

Figure 4:
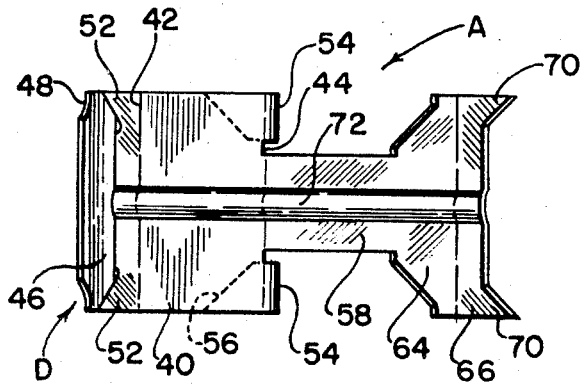
FIGS. 4 and 5 are rear and side views of the mounting clip of FIG. 1.

Between the two arms 54, extending downwardly and forwardly at a greater angle with respect to the trunk portion than the arms, is a longitudinally extending leg 58. This leg is bent intermediate its ends to define upper and lower portions 64 and 66, and a knee 68 intermediate said portions. The lower portion projects downwardly and rearwardly from the upper portion, the lower portion terminating in spaced apart feet 70, as shown in FIG. 4. Although the feet are shown as flattened at their ends, they could be pointed or have some other configuration.

Referring to FIG. 5, the knee 68 and ends or tips 56 of the arms establish a plane with which the upper and lower portions 64 and 66 of the leg 58 define acute angles, preferably, substantially the same acute angle. Also with reference to this figure, and FIG. 6, preferably the plane so established is substantially perpendicular with that established by the planar surfaces of the head portion D, the nose 51 of the latter being parallel with but recessed rearwardly of the plane of the knee 68 and arm ends 56.

FIG. 3 illustrates operation of the interim mounting clip in accordance with the invention. Following attachment of the clip to an outlet box, the clip and outlet box are moved together against the stud C. Initially as shown in dashed lines, the pointed ends or tips 56 of the arms 54 are positioned to engage the underside of the lip or bead 18 of the stud channel, and the outlet box and clip are pivoted against the tip pressing the leg 58 against the base section or web 16 of the channel. In this latter step, the leg is deformed sufficiently to allow the lower portion 66 to slide across the web until the feet 70 engage the ridge 24 of the channel, snapping into place in the trough 22; the leverage provided by the trunk portion 40 being adequate to deform the stiff spring metal steel. When this is achieved, the knee 68 of the clip, lying in substantially the same plane with the arm ends 56, engages the flange surface 14, the leg lower portion thereby being wedged diagonally between the mutually perpendicular web and flange of the channel. Deformation of the clip between its normal and channel engaged configurations is shown in FIG. 5.

Referring again to FIG. 3, it is apparent that the mounting clip is held or located by three lines of contact, the ends 56 of the arms, the knee 68, and the feet 70. In that the knee is wedged against the channel flange by the action of the lower portion, it is apparent that the plane defined by the arm ends 56 and knee is substantially parallel with the flange. The result is that the head planar surfaces 48 and 50 are substantially perpendicular to the channel flange, and the outlet box side walls 26 are also at right angles to the flange. In addition, by virtue of the length of the arms 54, and slightly rearwardly recessed position of the parallel nose 51 of the head portion, the outlet box free edges 30 are substantially parallel with but spaced from the plane of the wall panel 32.

Figure 6:
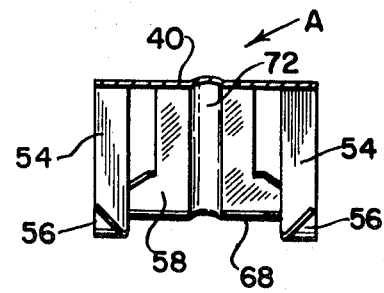
FIG. 6 is a section view through line 6—6 of FIG. 5.

FIGS. 1, 4 and 6 show a longitudinally extending depression 72 (or ridge, if viewed from the rear, FIG. 4) formed in the mounting clip. The purpose of the depression (or ridge) is to add structural strength against bending to the mounting clip.

Advantages of the invention should now be apparent. In particular, by virtue of the three lines of contact, the interim mounting clip is easily and repeatedly or consistently oriented and positioned so the electrical outlet boxes mounted thereby are in a predetermined and desired relationship with respect to the flange 14 of the stud, and with respect to the plane of the dry wall panels. This orientation is accomplished with little or no attention given to it on the part of the workman installing the electrical outlet box.

As a further advantage, the inside of the electrical outlet box is free of metallic protrusions or extensions which could cause shorts within the box. The reason for this is that the roof or upper part 48 of the bead portion, within the outlet box, is an unbroken planar surface. The sharp contact points or prongs 52 which engage the wall of the outlet box are formed from the lower planar surface and extend upwardly into the slot of the head portion, holding the inside of the box against the upper planar surface.

Although the invention has been described with reference to specific embodiments, variations within the scope of the following claims will be apparent to those skilled in the art.

What is claimed is:

1. An interim mounting clip for an electrical outlet box for use in dry wall construction, said clip comprising:
   a base portion including upper and lower ends;
   a fixture engaging head portion connected to said upper end including reversely bent, spaced parallel planar surfaces forming a rearwardly facing slot adapted to receive and grip an edge of the side of the outlet box;
   a flexible forwardly extending arm means spaced from said head portion extending from said base portion in a direction substantially parallel with said planar surfaces;
   flange engaging tips at the end of said arm means extending towards said head portion at an angle of less than 90° relative to said arm means and spaced from said base portion, said tips further converging from said arm means to form an engaging surface;
   downwardly and forwardly extending leg means also spaced from said head means connected to said base portion lower end in diverging relationship with said arm means;
   said leg means being bent to define an upper portion and a lower portion, a knee intermediate said portions, said lower portion projecting rearwardly from said upper portion;
   said knee and flange engaging tips establishing a plane with which said upper and lower portions define acute angles;
   said plane and head portion planar surfaces being mutually substantially perpendicular;
   said head portion defining a curved forwardmost surface parallel with but slightly rearwardly, recessed from said flange engaging tips, against which the edge of the outlet box is positioned.

2. An interim mounting clip for use in maintaining a construction element in a predetermined desired position relative to a metal stud construction element during dry wall type construction, said clip comprising:
   means for receiving said element relative to said metal stud, said means for receiving including a head portion comprised of first and second spaced apart planar surfaces joined together at one end by a nose member to define an element engaging head;
   at least one resilient arm member spaced apart from said slot and generally coextensive therewith and including first means for engagement of said stud element at the distal end thereof;
   a trunk portion connecting said means for receiving and said arm member; and
   a resilient leg member extending outwardly from said trunk portion in a downwardly diverging direction relative to said at least one arm member, said leg member including second means for engaging said metal stud element whereby when said mounting clip is received by said metal stud, the distal ends of said arm and said leg form a plane generally perpendicular to the plane of said head.

3. The mounting clip as defined in claim 2 wherein said first means comprises a flange engaging tip extending upwardly from said arm towards said means for receiving at an angle of less than 90° relative to said arm.

4. The mounting clip as defined in claim 2 wherein said second means comprises at least one metal stud engaging foot extending from said leg generally outwardly and away from said arm.

5. The mounting clip as defined in claim 2 wherein said means for receiving further includes means for retaining said element in said head, said retaining means comprising at least one resilient contact element extending from the area of at least one of said first and second surfaces into said head.

6. The mounting clip as defined in claim 5 wherein said retaining means comprises a plurality of said contacts spaced along said second surface adjacent said trunk portion to extend generally downwardly into said head.

7. The mounting clip as defined in claim 2 wherein said at least one arm member comprises two said arm members in spaced apart relationship with said leg member extending therebetween.

References Cited

UNITED STATES PATENTS

| | | | |
|---|---|---|---|
| 2,982,508 | 5/1961 | Larsen et al. | 248—205 |
| 3,360,151 | 12/1967 | Yznaga | 220—3.9 |
| 3,376,005 | 4/1968 | Swanquist | 248—223 |
| 3,474,994 | 10/1969 | Swanquist | 248—228X |

FOREIGN PATENTS

| | | | |
|---|---|---|---|
| 1,005,986 | 9/1965 | Great Britain | 24—73 |

ROY D. FRAZIER, Primary Examiner

J. F. FOSS, Assistant Examiner

U.S. Cl. X.R.

24—73; 220—3.9; 248—229